(12) United States Patent
Huang et al.

(10) Patent No.: US 12,445,606 B2
(45) Date of Patent: Oct. 14, 2025

(54) VIDEO ENCODER AND VIDEO ENCODING METHOD

(71) Applicant: SigmaStar Technology Ltd., Xiamen (CN)

(72) Inventors: Zhen Bao Huang, Shanghai (CN); Qun Wang, Shanghai (CN); Shao Bo Zhang, Shanghai (CN)

(73) Assignee: SigmaStar Technology Ltd., Xiamen (CN)

( * ) Notice: Subject to any disclaimer, the term of this patent is extended or adjusted under 35 U.S.C. 154(b) by 0 days.

(21) Appl. No.: 18/731,411

(22) Filed: Jun. 3, 2024

(65) Prior Publication Data
US 2025/0071269 A1  Feb. 27, 2025

(30) Foreign Application Priority Data
Aug. 22, 2023 (CN) ......................... 202311061238.0

(51) Int. Cl.
*H04N 19/107* (2014.01)
*H04N 19/105* (2014.01)
*H04N 19/176* (2014.01)

(52) U.S. Cl.
CPC ......... *H04N 19/107* (2014.11); *H04N 19/105* (2014.11); *H04N 19/176* (2014.11)

(58) Field of Classification Search
CPC .. H04N 19/107; H04N 19/105; H04N 19/176; H04N 19/11; H04N 19/593
See application file for complete search history.

(56) References Cited

U.S. PATENT DOCUMENTS

| 2003/0108099 A1* | 6/2003 | Nagumo | ................... G06T 9/20 375/E7.199 |
| 2013/0121401 A1* | 5/2013 | Zheludkov | ............. H04N 19/52 375/240.02 |
| 2022/0141459 A1* | 5/2022 | Sarwer | ................. H04N 19/132 375/240.02 |
| 2024/0098299 A1* | 3/2024 | Gao | ...................... H04N 19/109 |

OTHER PUBLICATIONS

OA letter of a counterpart TW application (appl. No. 1112131979) mailed on Apr. 30, 2024. Summary of the TW OA letter: Claim(s) 1-5 and 10-14 is/are rejected under Patent Law Article 22(2) as allegedly being unpatentable.

* cited by examiner

*Primary Examiner* — Joseph Suh
(74) *Attorney, Agent, or Firm* — WPAT, PC (57) ABSTRACT

A video coding method includes the following steps: performing a first optimization operation on a sub-coding block to select original pixels or reconstructed pixels of an adjacent block of the sub-coding block according to a base prediction mode to generate an intermediate prediction mode of the sub-coding block; performing a second optimization operation on the sub-coding block to determine a prediction mode according to the intermediate prediction mode, the original pixels of the sub-coding block, and the reconstructed pixels of the adjacent block; generating prediction information of the sub-coding block according to the original pixels of the sub-coding block, the reconstructed pixels of the adjacent block, and the prediction mode; generating encoding coefficients and reconstructed pixels of the sub-coding block according to the prediction information of the sub-coding block; and generating a bit stream according to the encoding coefficients and the prediction information.

14 Claims, 12 Drawing Sheets

VIDEO ENCODER AND VIDEO ENCODING METHOD

This application claims the benefit of China application Serial No. 202311061238, filed on Aug. 22, 2023, the subject matter of which is incorporated herein by reference.

BACKGROUND OF THE INVENTION

1. Field of the Invention

The present invention generally relates to video encoding, and, more particularly, to video encoders and video encoding methods.

2. Description of Related Art

In the field of video encoding, fast rate-distortion optimization (RDO) algorithm and full RDO algorithm are commonly used for mode prediction. Full RDO corresponds to the conventional real standard, which refers to the rate-distortion cost (RD cost) evaluation method according to Lagrange (as shown in equation (1) below):

$$J = \mathrm{argmin}(D + \lambda R) \quad (1)$$

where J is the RD cost of a certain mode; D is the distortion corresponding to the mode; R is the rate cost corresponding to the mode, including the Mode syntax cost and the coefficient Syntax cost; A is the coefficient corresponding to the current quantization parameter.

Full RDO performs the calculation of equation (1) on each candidate mode and selects the mode corresponding to the minimum J as the best mode. However, this costs significant hardware resources and time.

Fast RDO is calculated according to equation (2). Because R' includes only the Mode syntax cost but not the coefficient Syntax cost, fast RDO can significantly save hardware resources and time.

$$J = \mathrm{argmin}(D + \lambda R') \quad (2)$$

However, fast RDO is less accurate if it is calculated based on original pixels rather than on reconstructed pixels. Reconstructed pixels refer to the result of prediction, residual calculation, transformation, quantization, inverse quantization, inverse transformation, and reconstructing (sometimes including filtering) performed on the original pixels.

Therefore, a video encoder and method are needed to improve speed and accuracy.

SUMMARY OF THE INVENTION

In view of the issues of the prior art, an object of the present invention is to provide a video encoder and a video encoding method, so as to make an improvement to the prior art.

According to one aspect of the present invention, a video encoder is provided. The video encoder includes a prediction circuit, a computing circuit, and a coding circuit. The prediction circuit is configured to perform a first optimization operation on a first sub-coding block to select original pixels or reconstructed pixels of an adjacent block of the first sub-coding block according to a base prediction mode to generate an intermediate prediction mode of the first sub-coding block; to perform a second optimization operation on the first sub-coding block to determine a prediction mode according to the intermediate prediction mode, original pixels of the first sub-coding block, and the reconstructed pixels of the adjacent block of the first sub-coding block; and to generate prediction information of the first sub-coding block according to the original pixels of the first sub-coding block, the reconstructed pixels of the adjacent block of the first sub-coding block, and the prediction mode, wherein the prediction information includes a plurality of predicted pixels and a residual value between the original pixels and the plurality of predicted pixels. The computing circuit is coupled to the prediction circuit and configured to generate a plurality of encoding coefficients and reconstructed pixels of the first sub-coding block according to the prediction information of the first sub-coding block. The coding circuit is coupled to the prediction circuit and the computing circuit and configured to generate a bit stream according to the plurality of encoding coefficients and the prediction information.

According to another aspect of the present invention, a video encoding method is provided. The video encoding method includes the following steps: performing a first optimization operation on a first sub-coding block to select original pixels or reconstructed pixels of an adjacent block of the first sub-coding block according to a base prediction mode to generate an intermediate prediction mode of the first sub-coding block; performing a second optimization operation on the first sub-coding block to determine a prediction mode according to the intermediate prediction mode, original pixels of the first sub-coding block, and the reconstructed pixels of the adjacent block of the first sub-coding block; generating prediction information of the first sub-coding block according to the original pixels of the first sub-coding block, the reconstructed pixels of the adjacent block of the first sub-coding block, and the prediction mode, wherein the prediction information includes a plurality of predicted pixels and a residual value between the original pixels and the plurality of predicted pixels; generating a plurality of encoding coefficients and reconstructed pixels of the first sub-coding block according to the prediction information of the first sub-coding block; and generating a bit stream according to the plurality of encoding coefficients and the prediction information.

The technical means embodied in the embodiments of the present invention can solve at least one of the problems of the prior art. Therefore, compared to the prior art, the present invention can improve the speed and accuracy of prediction.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a video encoder and a video encoding method. On account of that some or all elements of the video encoder could be known, the detail of such elements is omitted provided that such detail has little to do with the features of this disclosure, and that this omission nowhere dissatisfies the specification and enablement requirements. Some or all of the processes of the video encoding method may be implemented by software and/or firmware and can be performed by the video encoder or its equivalent. A person having ordinary skill in the art can choose components or steps equivalent to those described in this specification to carry out the present invention, which means that the scope of this invention is not limited to the embodiments in the specification.

Figure 1:
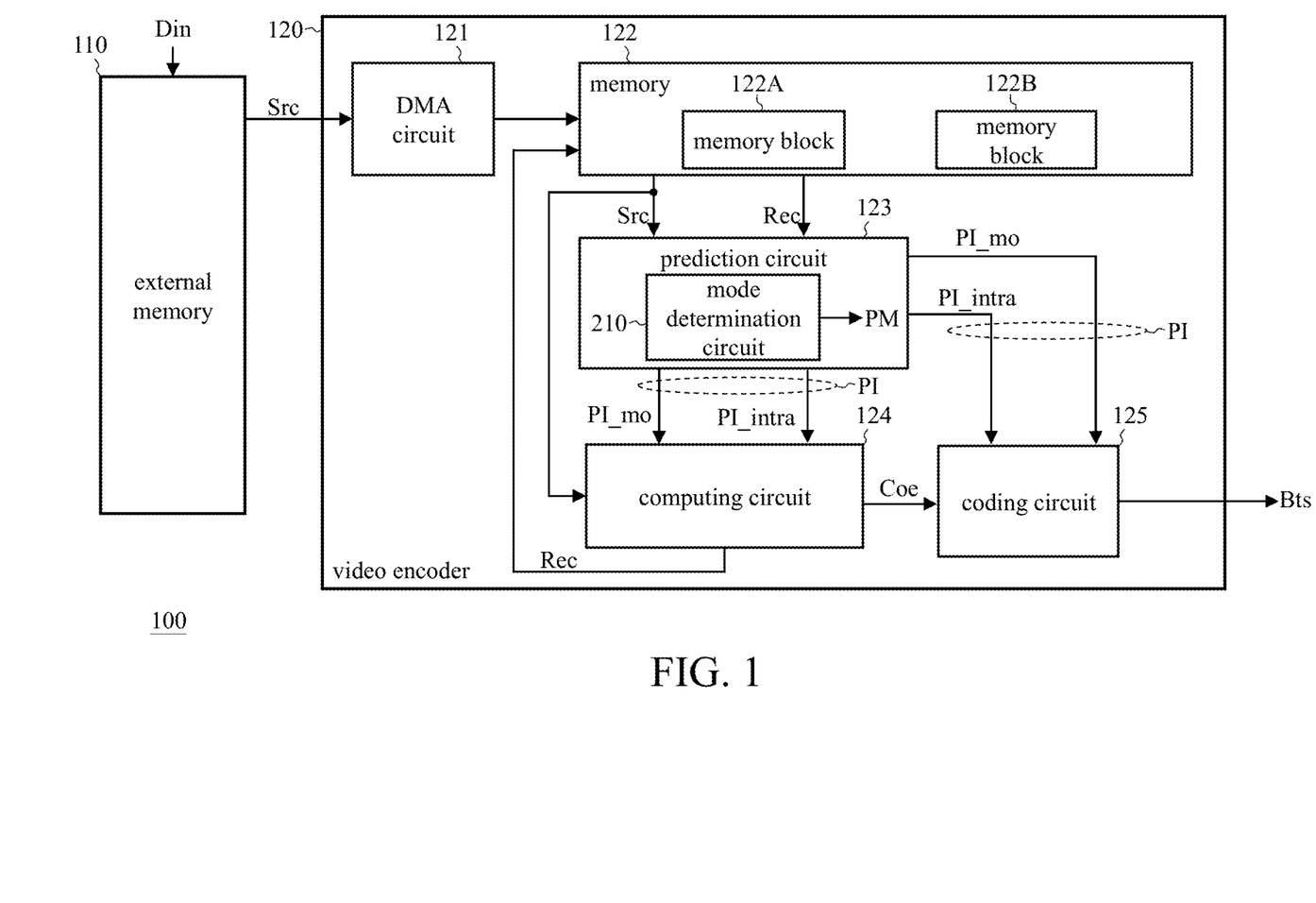
FIG. 1 is a functional block diagram of an electronic device according to an embodiment of the present invention.

Reference is made to FIG. 1, which is a functional block diagram of an electronic device according to an embodiment of the present invention. The electronic device 100 includes an external memory 110 and a video encoder 120. The video encoder 120 includes a direct memory access (DMA) circuit 121, a memory 122, a prediction circuit 123, a computing circuit 124, and a coding circuit 125. The memory 122 includes a memory block 122A and a memory block 122B. The prediction circuit 123 includes a mode determination circuit 210.

The external memory 110 stores the video data Din. The DMA circuit 121 reads the original pixels Src from the video data Din from the external memory 110 and stores the original pixels Src in the memory block 122A. The memory block 122B stores the reconstructed pixels Rec generated by the computing circuit 124.

The prediction circuit 123 generates prediction information PI according to the prediction mode PM, the original pixels Src, and the reconstructed pixels Rec of a reference block. The prediction information PI includes inter prediction information (such as motion information PI_mo) and intra prediction information PI_intra. The computing circuit 124 generates the reconstructed pixels Rec and the encoding coefficients Coe according to the prediction information PI. The coding circuit 125 generates a bit stream Bts based on the prediction information PI and the encoding coefficients Coe.

Operations performed by the computing circuit 124 include transformation, quantization, inverse quantization, inverse transformation, and filtering. As the operating principles of the computing circuit 124 and the coding circuit 125 are well known to people having ordinary skill in the art, the details are omitted for brevity.

Figure 2:
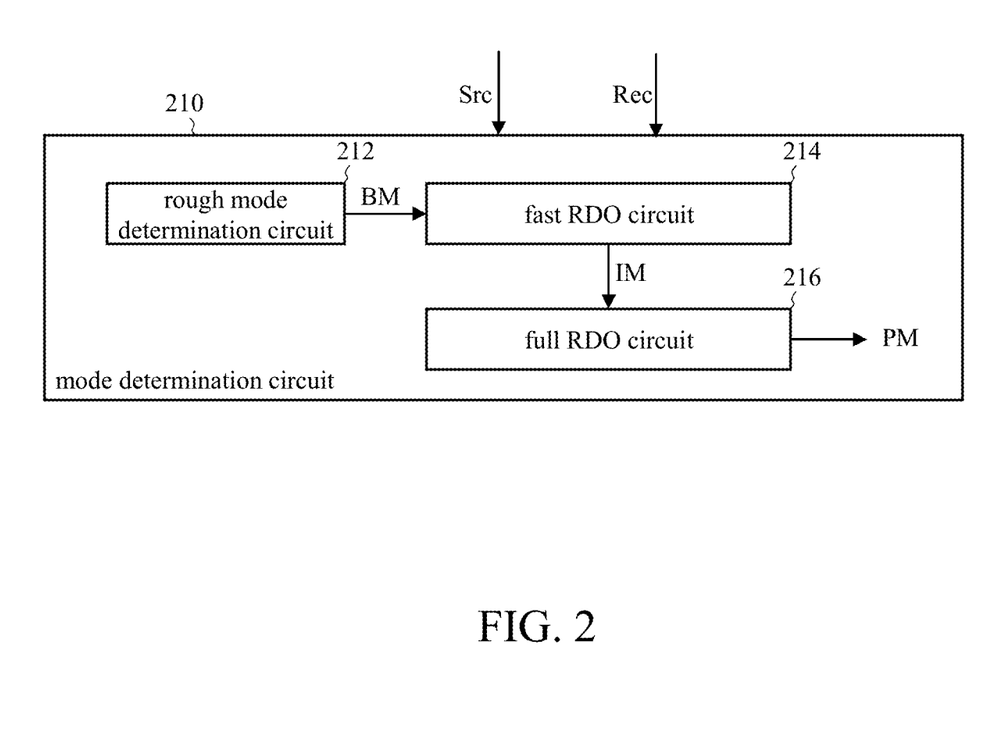
FIG. 2 is a functional block diagram of a mode determination circuit according to an embodiment of the present invention.

Reference is made to FIG. 2, which is a functional block diagram of a mode determination circuit according to an embodiment of the present invention. The mode determination circuit 210 is a part of the prediction circuit 123 and includes a rough mode determination circuit 212, a fast RDO circuit 214, and a full RDO circuit 216.

The rough mode determination circuit 212 selects a base prediction mode BM from 8 main directions. The fast RDO circuit 214 determines 6 directions based on the direction corresponding to the base prediction mode BM and then selects an intermediate prediction mode IM from the direction corresponding to the base prediction mode BM, these 6 directions, and additional 3 predetermined directions (resulting in a total of 10 modes). The full RDO circuit 216 determines the prediction mode PM based on the intermediate prediction mode IM. In the process of generating the intermediate prediction mode IM, the fast RDO circuit 214 performs a first optimization operation using the original pixels Src or the reconstructed pixels Rec. In the process of generating the prediction mode PM, the full RDO circuit 216 uses the reconstructed pixels Rec to perform a second optimization operation.

More specifically, for I frames, the fast RDO circuit 214 selects 2 from the 10 modes, and then the full RDO circuit 216 determines the optimal mode (i.e., the prediction mode PM) from these 2 modes for final intra prediction. For P frames, the fast RDO circuit 214 performs an intra prediction to select a better intra mode from the 10 modes and performs an inter prediction to obtain a better inter mode. Then, the full RDO circuit 216 compares the better intra mode with the better inter mode to generate the prediction mode PM.

Figure 3:
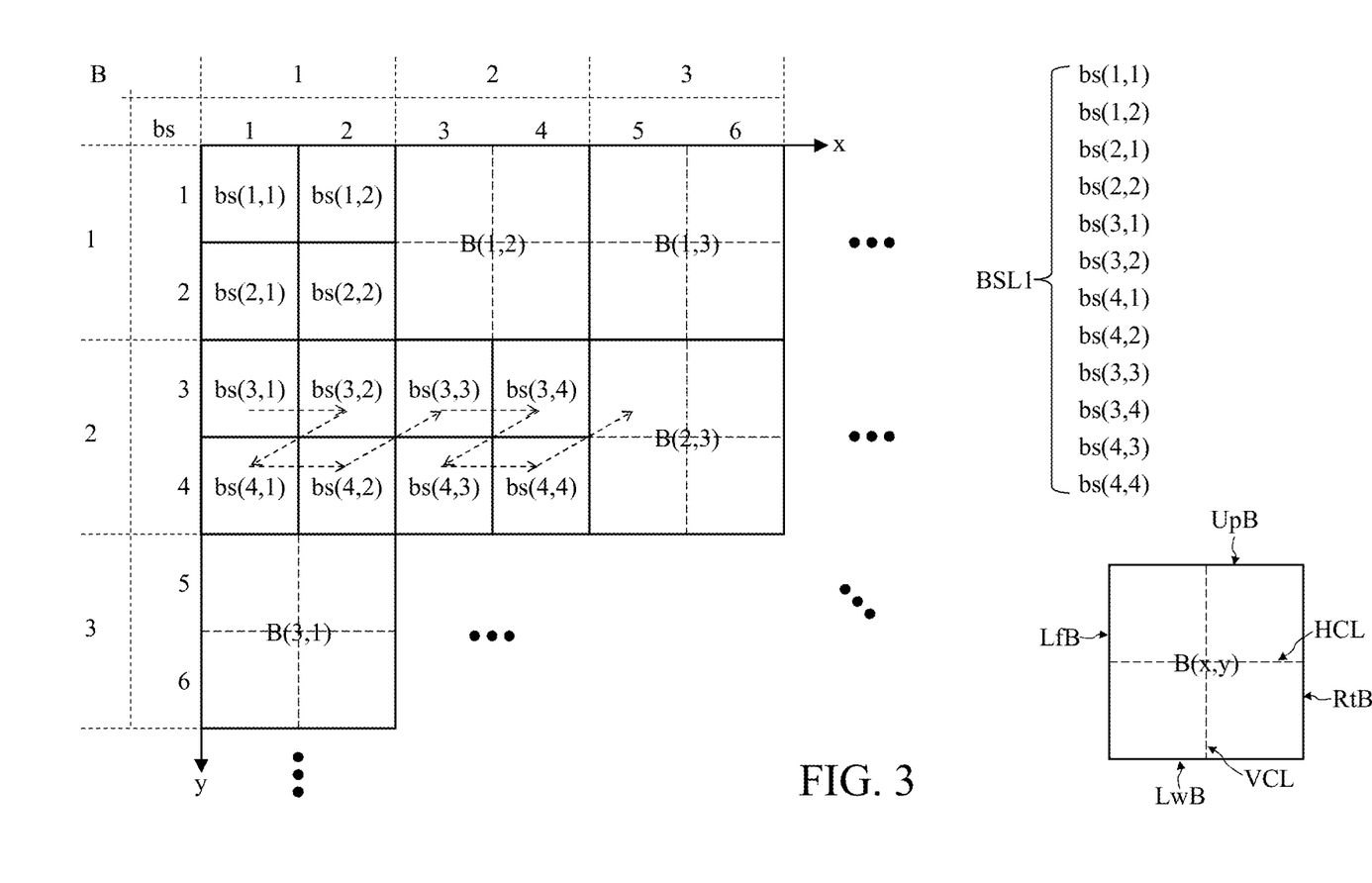
FIG. 3 is a schematic diagram of a frame according to an embodiment of the present invention.

Reference is made to FIG. 3, which is a schematic diagram of a frame according to an embodiment of the present invention. A frame contains multiple coding blocks (B(1,1), B(1,2), B(1,3), . . . , B(2,1), B(2,2), B(2,3), . . . , B(3,1), . . . ), and each coding block contains multiple first-level sub-coding blocks BSL1. For example, the first-level sub-coding block BSL1 of the coding block B(1,1) includes sub-coding blocks bs(1,1), bs(1,2), bs(2,1), and bs(2,2); the first-level sub-coding block BSL1 of the coding block B(2,1) includes sub-coding blocks bs(3,1), bs(3,2), bs(4,1), and bs(4,2); the first-level sub-coding block BSL1 of the coding block B(2,2) includes sub-coding blocks bs(3,3), bs(3,4), bs(4,3), and bs(4,4). B(1,1), B(1,2), and B(1,3) are arranged continuously, and B(2,1), B(2,2), and B(2,3) are arranged continuously.

The video encoder 120 processes the coding blocks sequentially from left to right and top to bottom (i.e., according to the following order: B(1,1)→B(1,2)→B(1,3)→ . . . →B(2,1)→B(2,2)→B(2,3)→ . . . →B(3,1)→ . . . ) and processes the sub-coding blocks in Z-order (i.e., taking the coding blocks in the second row as an example, according to the following order: bs(3,1)→bs(3,2)→bs(4,1)→bs(4,2)→bs(3,3)→bs(3,4)→bs(4,3)→bs(4,4)→ . . . ).

Each coding block (refer to the coding block B(x,y) in the lower right corner) has an upper boundary UpB (or upper edge), a lower boundary LwB (or lower edge), a left boundary LfB (or left edge), and a right boundary RtB (or right edge). Each coding block is divided equally by a horizontal center line HCL and by a vertical center line VCL. The horizontal center line HCL is parallel to the upper boundary UpB and the lower boundary LwB, while the vertical center line VCL is parallel to the left boundary LfB and the right boundary RtB.

Figure 4:
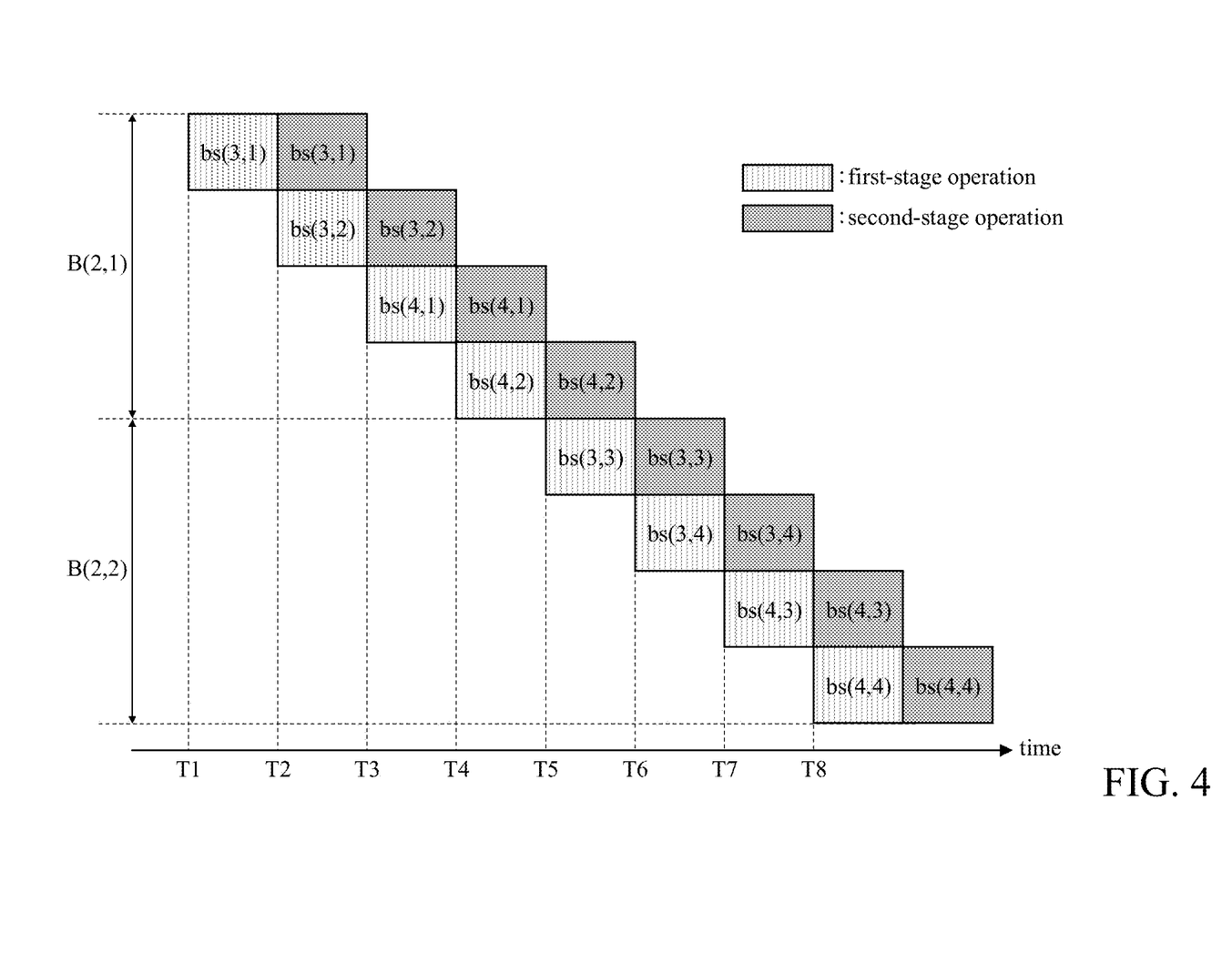
FIG. 4 is a schematic diagram of the operation timing of a sub-coding block according to an embodiment of the present invention.

Reference is made to FIG. 4, which is a schematic diagram of the operation timing of sub-coding blocks according to an embodiment of the present invention. FIG. 4 takes the coding block B(2,1) and the coding block B(2,2) as an example. The video encoder 120 first performs a first-stage operation and then a second-stage operation on a certain sub-coding block (e.g., the sub-coding block bs(3, 1)). It also simultaneously performs the first-stage operation and the second-stage operation respectively on two sub-coding blocks that are consecutive in the processing order (e.g., performing the second-stage operation on the sub-coding block bs(3,1) while performing the first-stage operation on the sub-coding block bs(3,2)). The first-stage operation includes but is not limited to the fast RDO circuit 214 generating the intermediate prediction mode IM according to the base prediction mode BM. The second-stage operation include but are not limited to the full RDO circuit 216 generating the prediction mode PM according to the intermediate prediction mode IM.

For example, between the time point T5 and the time point T6, when the full RDO circuit 216 is performing the second-stage operation on the sub-coding block bs(4,2), the fast RDO circuit 214 is performing the first-stage operation on the sub-coding block bs(3,3).

It should be noted that not all of the reconstructed pixels Rec corresponding to a certain sub-coding block are generated before the second-stage operation of the sub-coding block terminates. For example, all of the reconstructed pixels Rec of the sub-coding block bs(4,2) are not generated until the time point T6.

Figure 5:
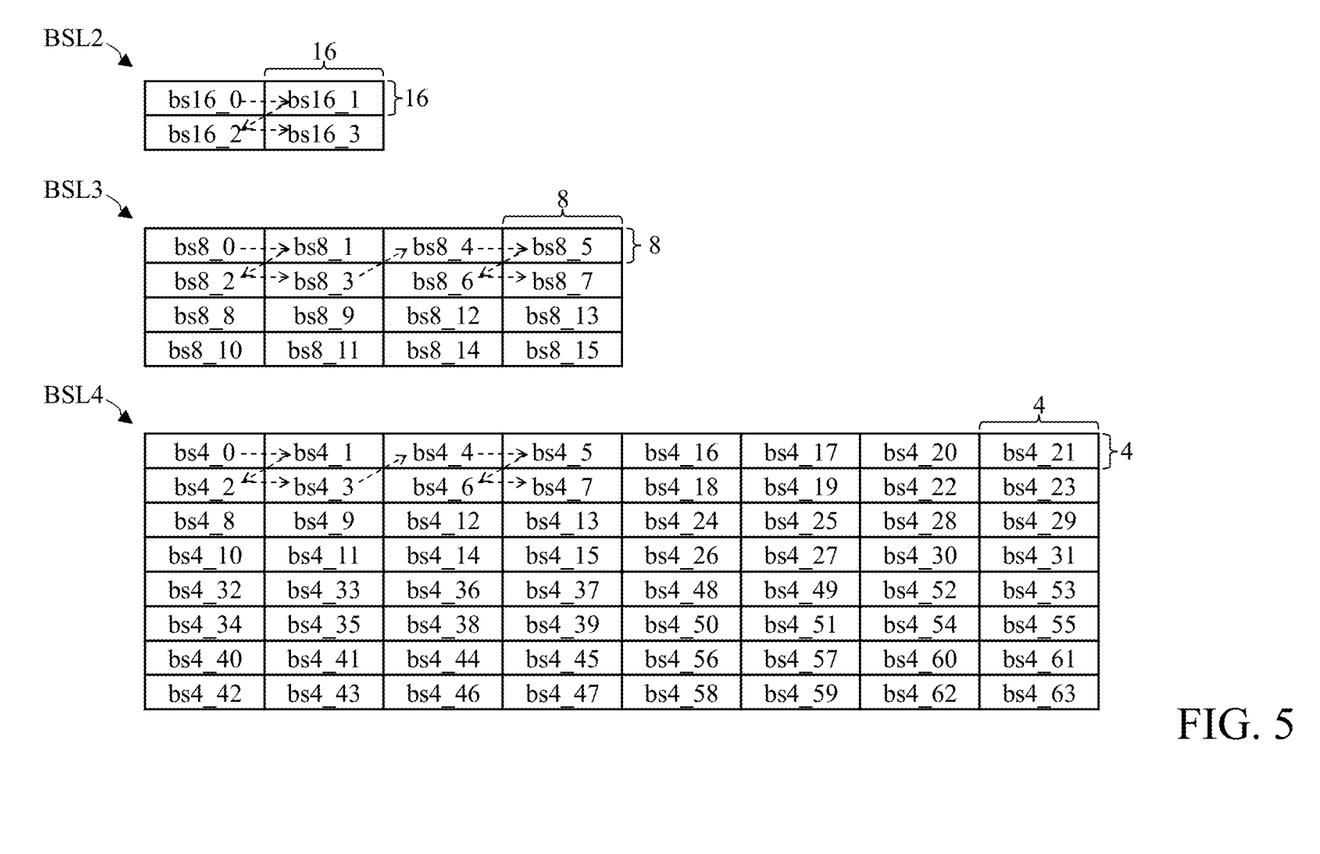
FIG. 5 is a schematic diagram of more levels of the coding block of the present invention.

Reference is made to FIG. 5, which is a schematic diagram of more levels of a coding block of the present invention. It is assumed here that the size of a coding block in FIG. 3 (e.g., the coding block B(2,2)) is 64*64 pixels. Accordingly, the size of any first-level sub-coding block BSL1 (e.g., the sub-coding block bs(3,3)) of the coding block is 32*32 pixels and contains 4 sub-coding blocks with a size of 16*16 pixels (i.e., bs16_0, bs16_1, bs16_2, bs16_3, collectively referred to as the second-level sub-coding block BSL2 of the coding block), 16 sub-coding blocks with a size of 8*8 pixels (i.e., bs8_0, bs8_1, bs8_2, . . . , bs8_14, bs8_15, collectively referred to as the third-level sub-coding block BSL3 of the coding block), and 64 sub-coding blocks with a size of 4*4 pixels (i.e., bs4_0, bs4_1, bs4_2, . . . , bs4_62, bs4_63, collectively referred to as the fourth-level sub-coding block BSL4 of the coding block).

Continuing with FIG. 5. The sub-coding block bs16_0 includes the sub-coding block bs8_0, the sub-coding block bs8_1, the sub-coding block bs8_2, and the sub-coding block bs8_3; the sub-coding block bs16_1 includes the sub-coding block bs8_4, the sub-coding block bs8_5, the sub-coding block bs8_6, and the sub-coding block bs8_7; and so on. The sub-coding block bs8_0 includes the sub-coding block bs4_0, the sub-coding block bs4_1, the sub-coding block bs4_2, and the sub-coding block bs4_3; the sub-coding block bs8_1 includes the sub-coding block bs4_4, the sub-coding block bs4_5, the sub-coding block bs4_6, and the sub-coding block bs4_7; and so on.

It should be noted that the video encoder 120 performs encoding operations separately on each level (i.e., the first-level sub-coding block BSL1, the second-level sub-coding block BSL2, the third-level sub-coding block BSL3, and the fourth-level sub-coding block BSL4). In each level, the video encoder 120 sequentially processes the sub-coding blocks according to their numerical order (i.e., bsP_Q where P is 16, 8, or 4, and Q ranges from 0-3, 0-15, or 0-63) (i.e., following the order indicated by the arrows in the figure).

Figure 6:
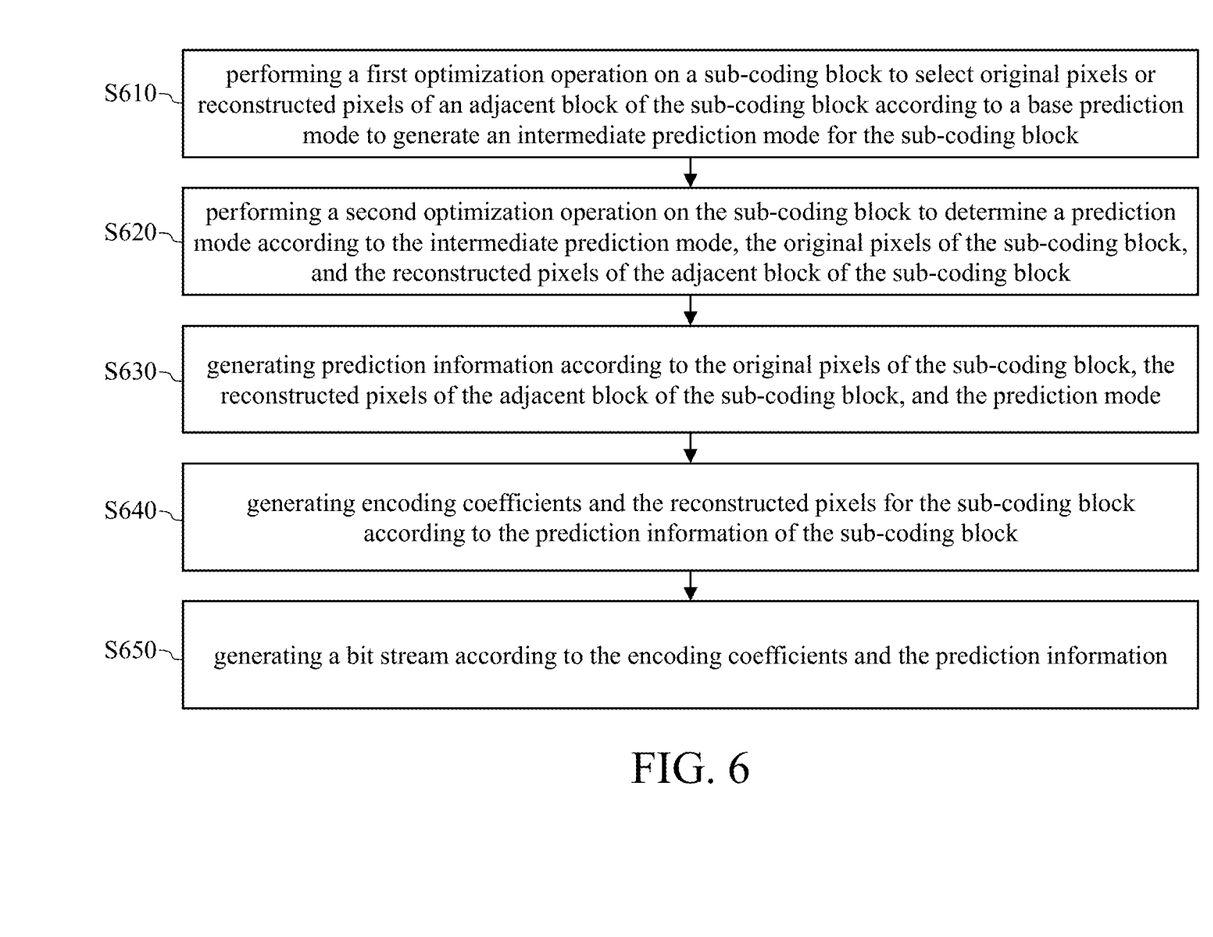
FIG. 6 is a flowchart of a video encoding method according to an embodiment of the present invention.

Reference is made to FIG. 6, which is a flowchart of a video encoding method according to an embodiment of the present invention. The flow includes the following steps.

Step S610: The fast RDO circuit 214 performs a first optimization operation on the sub-coding block to select the original pixels or reconstructed pixels of an adjacent block of the sub-coding block according to the base prediction mode BM to generate the intermediate prediction mode I for the sub-coding block. For example (see FIG. 3), if the sub-coding block is bs(3,3), then the pixels used by the fast RDO circuit 214 in this step include the original pixels Src of the sub-coding block bs(3,3) itself and the original pixels Src or reconstructed pixels Rec of its adjacent block (e.g., the sub-coding block bs(4,2), which can be regarded as the reference sub-coding block of the sub-coding block bs(3,3)).

Step S620: The full RDO circuit 216 performs a second optimization operation on the sub-coding block to determine the prediction mode PM according to the intermediate prediction mode IM, the original pixels Src of the sub-coding block, and the reconstructed pixels Rec of the adjacent block of the sub-coding block. For example (see FIG. 3), if the sub-coding block is bs(3,3), then the pixels used by the full RDO circuit 216 in this step include the original pixels Src of the sub-coding block bs(3,3) itself and the reconstructed pixels Rec of its adjacent block (e.g., the sub-coding block bs(4,2)). The full RDO circuit 216 may not require the original pixels Src of the adjacent block.

Step S630: The prediction circuit 123 generates the prediction information PI according to the original pixels Src of the sub-coding block, the reconstructed pixels Rec of the adjacent block of the sub-coding block, and the prediction mode PM. The prediction information PI includes the predicted pixels Prc in the intra prediction mode and the residual value RV between the original pixels Src and the predicted pixels Prc. It is well known to people having ordinary skill in the art that the predicted pixels Prc are generated based on the reconstructed pixels Rec in the prediction mode PM.

Step S640: The computing circuit 124 generates the encoding coefficients Coe and the reconstructed pixels Rec for the sub-coding block according to the prediction information PI of the sub-coding block.

Step S650: The coding circuit 125 generates the bit stream Bts according to the encoding coefficients Coe and the prediction information PI.

Reference is made to FIGS. 7A to 7E, which are partial flowcharts of the first optimization operation according to an embodiment of the present invention. In the following discussion, it is assumed that the coding block B(2,2) is the target coding block.

Figure 7A:
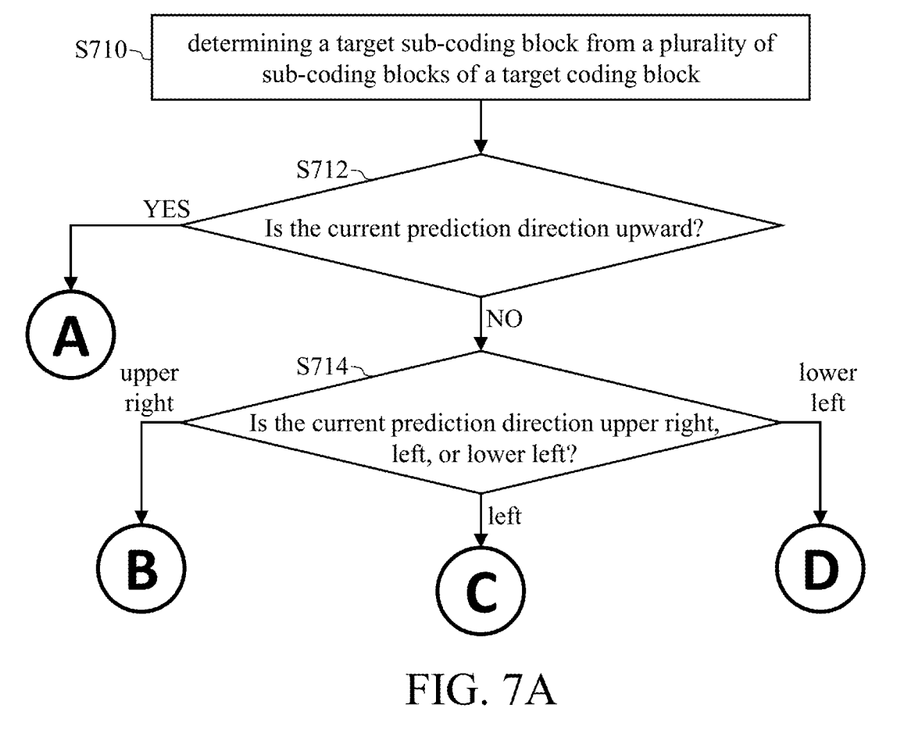
FIG. 7A to 7E are partial flowcharts of the first optimization operation according to an embodiment of the present invention.

Reference is made to FIG. 7A, which includes the following steps.

Step S710: The fast RDO circuit 214 determines a target sub-coding block from a plurality of sub-coding blocks of a target coding block. Reference is made to FIGS. 3 and 5. For example, the target sub-coding block may be one of the first-level sub-coding blocks BSL1 (i.e., one of the sub-coding blocks bs(3,3), bs(3,4), bs(4,3), and bs(4,4)), one of the second-level sub-coding blocks BSL2 (i.e., bs16_k, where 0≤k≤3), one of the third-level sub-coding blocks BSL3 (i.e., bs8_k, where 0≤k≤15), or one of the fourth-level sub-coding blocks BSL4 (i.e., bs4_k, where 0≤k≤63).

Step S712: The fast RDO circuit 214 determines whether the current prediction direction is upward. If YES, the flow proceeds to FIG. 7B; otherwise, the flow proceeds to step S714.

Step S714: The fast RDO circuit 214 determines whether the current prediction direction is upper right, left, or lower left. If the current prediction direction is upper right, the flow proceeds to FIG. 7C; if the current prediction direction is left, the flow proceeds to FIG. 7D; if the current prediction direction is lower left, the flow proceeds to FIG. 7E.

Figure 7B:
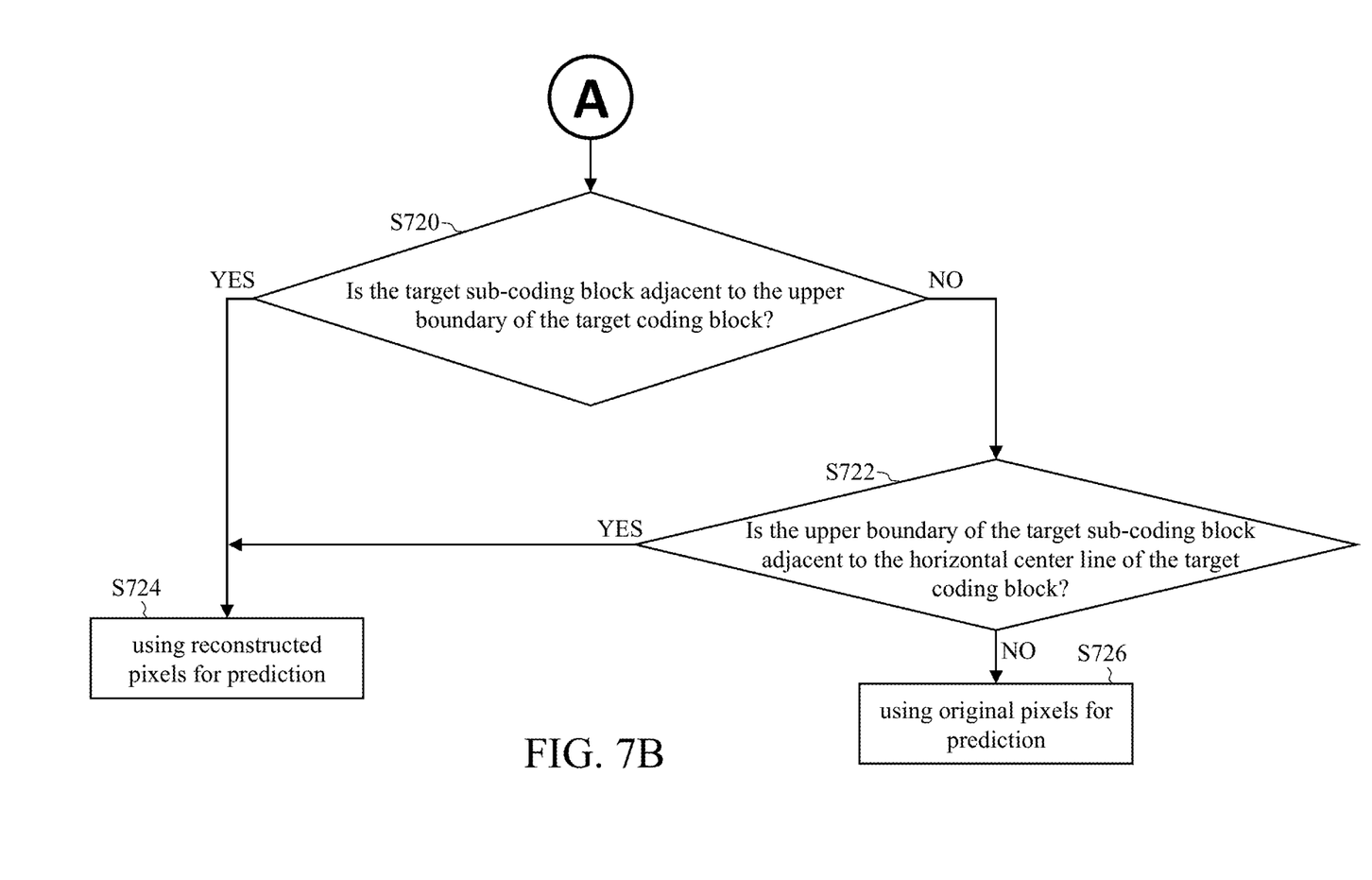

Reference is made to FIG. 7B, which includes the following steps.

Step S720: The fast RDO circuit 214 determines whether the target sub-coding block is adjacent to the upper boundary of the target coding block. When the target sub-coding block is adjacent to the upper boundary (lower boundary, left boundary, right boundary) of the target coding block, it means that the upper boundary (lower boundary, left boundary, right boundary) of the target sub-coding block and the upper boundary (lower boundary, left boundary, right boundary) of the target coding block substantially overlap, or that the upper boundary (lower boundary, left boundary, right boundary) of the target sub-coding block is a part of the upper boundary (lower boundary, left boundary, right boundary) of the target coding block.

Reference is made to FIGS. 3 and 5. For the coding block B(2,2), when the target sub-coding block is one of the sub-coding blocks bs(3,3), bs(3,4), bs16_0, bs16_1, bs8_0, bs8_1, bs8_4, bs8_5, bs4_0, bs4_1, bs4_4, bs4_5, bs4_16, bs4_17, bs4_20, and bs4_21, the result of step S720 is YES (proceed to step S724); otherwise, the result of step S720 is NO (proceed to step S722).

Step S722: The fast RDO circuit 214 determines whether the upper boundary of the target sub-coding block is adjacent to the horizontal center line HCL of the target coding block. Reference is made to FIG. 3. The upper boundaries of the sub-coding blocks bs(3,3) and bs(3,4) are not adjacent to the horizontal center line HCL, while the upper boundaries of the sub-coding blocks bs(4,3) and bs(4,4) are adjacent to the horizontal center line HCL. Reference is made to FIG. 5. For the sub-coding blocks bs(4,3) and bs(4,4), the upper boundaries of the sub-coding blocks bs16_0, bs16_1, bs8_0, bs8_1, bs8_4, bs8_5, bs4_0, bs4_1, bs4_4, bs4_5, bs4_16, bs4_17, bs4_20, and bs4_21 are adjacent to the horizontal center line HCL.

Step S724: The fast RDO circuit 214 uses the reconstructed pixels Rec of the adjacent block above the target sub-coding block to perform prediction. For the first situation (the result of step S720 is YES), because the second-stage operation for the adjacent block (i.e., the coding block B(1,2)) above the sub-coding blocks bs(3,3) and bs(3,4) has been completed, the fast RDO circuit 214 can use the reconstructed pixels Rec of the adjacent block to perform prediction. For the second situation (the result of step S722 is YES), because the second-stage operation of the adjacent block above the sub-coding blocks bs(4,3) and bs(4,4) (i.e., the sub-coding blocks bs(3,3) and bs(3,4) respectively) has been completed, the fast RDO circuit 214 can use the reconstructed pixels Rec of the adjacent block to perform prediction.

In some embodiments, the number of reconstructed pixels Rec required by the fast RDO circuit 214 to perform the first optimization is related to the size of the target sub-coding block, and the required reconstructed pixels Rec are adjacent to the boundary of the target coding block. For example, when the size of the target sub-coding block is 32*32 (16*16, 8*8, 4*4) pixels, the fast RDO circuit 214 requires 32 (16, 8, 4) reconstructed pixels Rec, and the 32 (16, 8, 4) reconstructed pixels Rec are adjacent to the boundary of the target sub-coding block. In some embodiments, the fast RDO circuit 214 reads the required reconstructed pixels Rec from a line buffer of the memory 122 (not shown, e.g., a part of the memory block 122B).

Step S726: The fast RDO circuit 214 uses the original pixels Src of the adjacent block above the target sub-coding block to perform prediction. When in the prediction direction the target sub-coding block is not adjacent to any first-level sub-coding block BSL1 for which the second-stage operation has been completed, the fast RDO circuit 214 can only use the original pixels Src of the adjacent block to perform prediction. That is, when the fast RDO circuit 214 cannot obtain the required reconstructed pixels Rec of the adjacent block, the fast RDO circuit 214 uses the original pixels Src of the adjacent block instead to perform prediction.

Figure 7C:
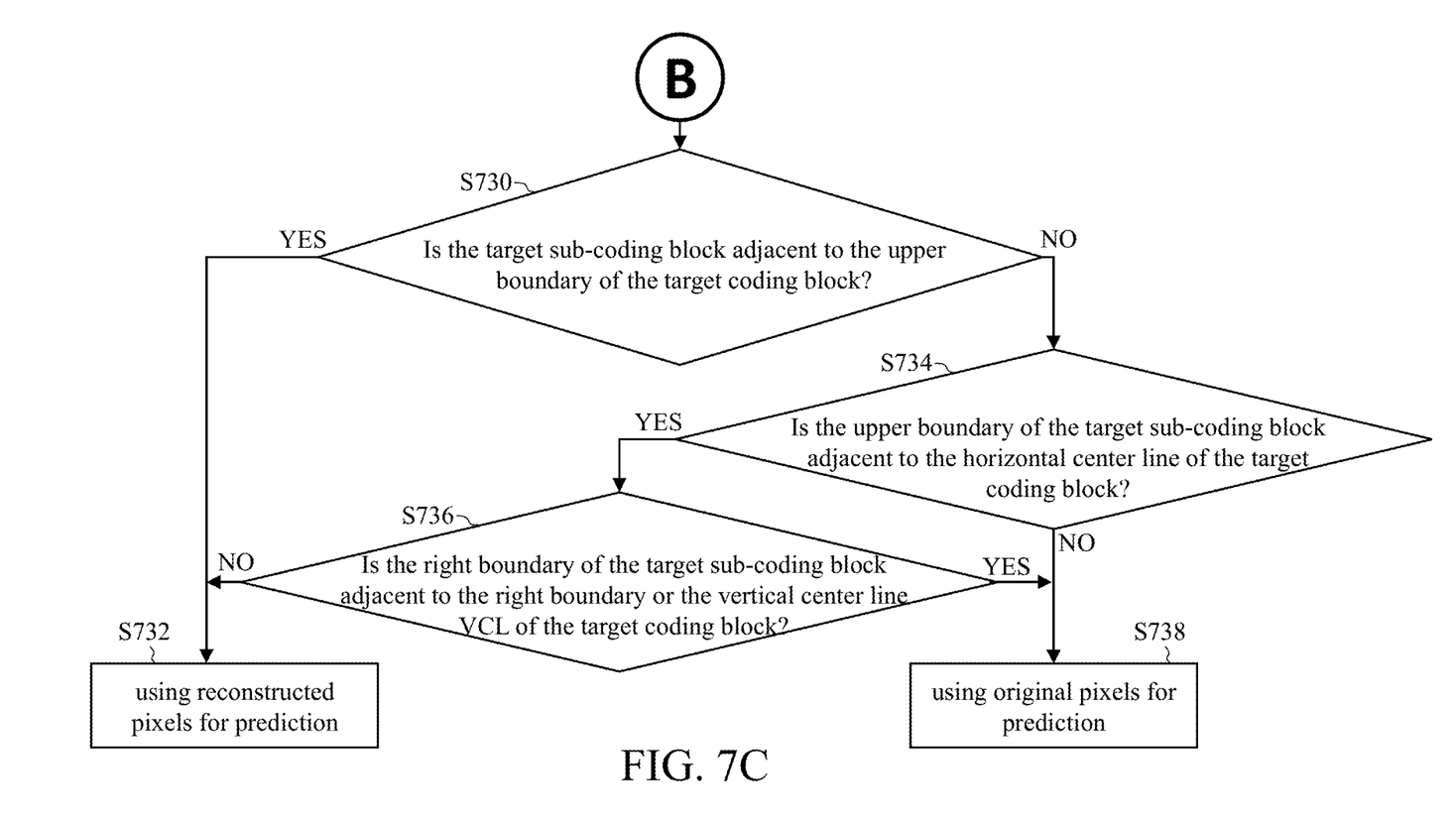

Reference is made to FIG. 7C, which includes the following steps.

Step S730: The fast RDO circuit 214 determines whether the target sub-coding block is adjacent to the upper boundary of the target coding block. This step is the same as step S720. If the result of step S730 is YES, the fast RDO circuit 214 performs step S732; otherwise, the fast RDO circuit 214 performs step S734.

Step S732: The fast RDO circuit 214 uses the reconstructed pixels Rec of the adjacent block to the upper right of the target sub-coding block to perform prediction. Refer to the discussion of step S724. For example, given that the second-stage operations for the above coding blocks (the coding block B(1,2)) and the upper right (the coding block B(1,3)) of the target coding block (the coding block B(2,2)) have been completed, the fast RDO circuit 214 can use the reconstructed pixels Rec of the coding blocks B(1,2) and B(1,3) to perform prediction.

Step S734: The fast RDO circuit 214 determines whether the upper boundary of the target sub-coding block is adjacent to the horizontal center line HCL of the target coding block. Refer to the discussion of step S722.

Step S736: The fast RDO circuit 214 determines whether the right boundary of the target sub-coding block is adjacent to the right boundary or the vertical center line VCL of the target coding block. Reference is made to FIGS. 3 and 5. For example, for the sub-coding block bs(4,3) and its sub-coding blocks bs16_1, bs8_5, and bs4_21, because their right boundaries are adjacent to the vertical center line VCL of the target coding block, the result of step S736 is YES; for the sub-coding block bs(4,4) and its sub-coding blocks bs16_1, bs8_5, and bs4_21, because their right boundaries are adjacent to the right boundary RtB of the target coding block, the result of step S736 is YES. For other sub-coding blocks whose upper boundaries are adjacent to the horizontal center line HCL, the result of step S736 is NO.

Step S738: The fast RDO circuit 214 uses the original pixels Src of the adjacent block to the upper right of the target sub-coding block to perform prediction. Refer to the discussion of step S726. For example, for the sub-coding block bs16_1 of the sub-coding block bs(4,3) (or bs(4,4)), because the corresponding sub-coding block (namely, the adjacent block) to its upper right is a part of the sub-coding block bs(3,4) (or the coding block B(2,3)), and the second-stage operation for the sub-coding block bs(3,4) (or the coding block B(2,3)) has not yet been completed (or started), the fast RDO circuit 214 at this time uses the original pixels Src of the adjacent block (i.e., the sub-coding block bs(3,4) (or the coding block B(2,3))) instead to perform prediction.

Figure 7D:
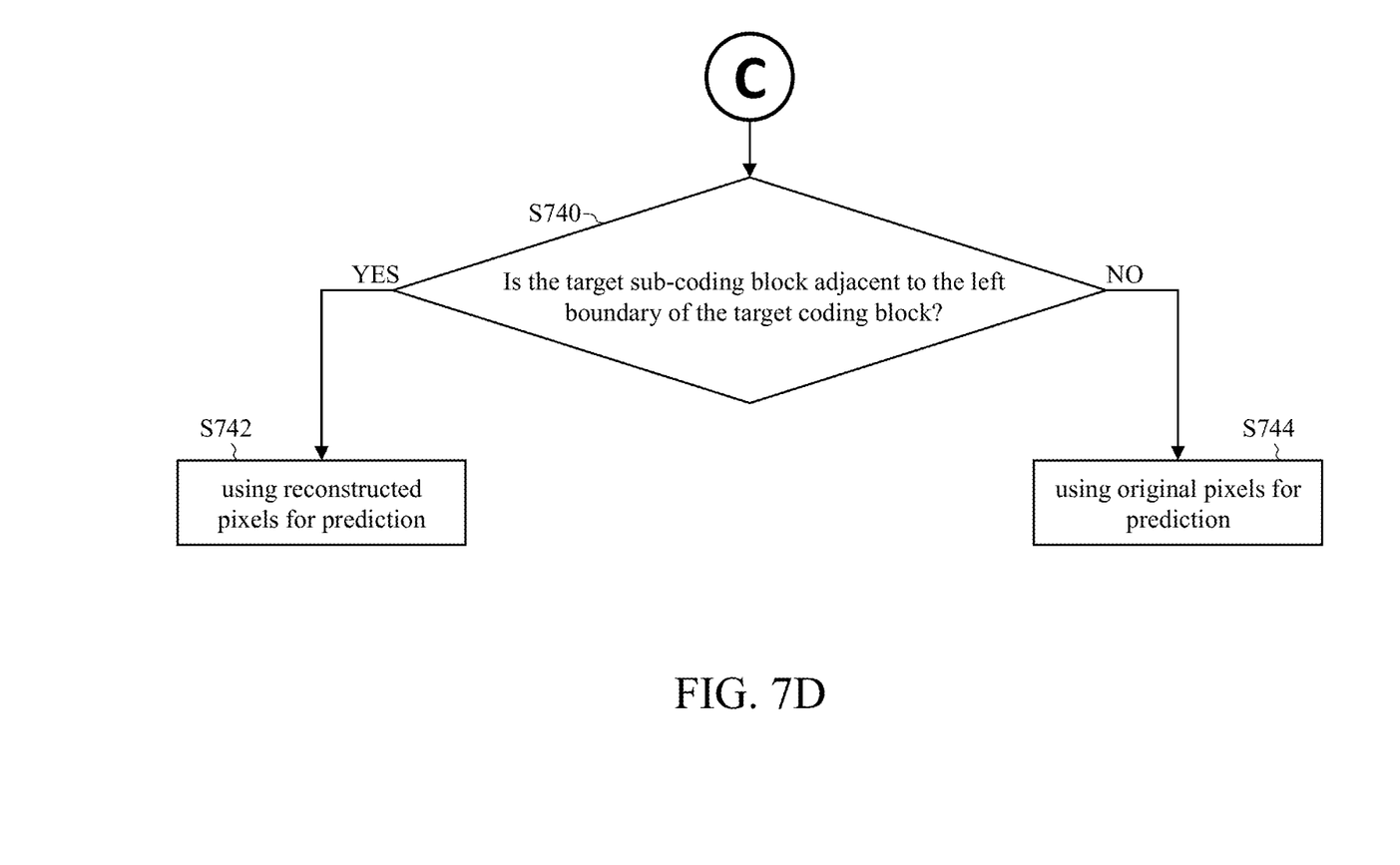

Reference is made to FIG. 7D, which includes the following steps.

Step S740: The fast RDO circuit 214 determines whether the target sub-coding block is adjacent to the left boundary of the target coding block. Reference is made to FIG. 3. The sub-coding blocks bs(3,3) and bs(4,3) are adjacent to the left boundary of the coding block B(2,2), and the sub-coding blocks bs(3,4) and bs(4,4) are not adjacent to the left boundary of the coding block B(2,2). Reference is made to FIG. 5. For the sub-coding blocks bs(3,3) and bs(4,3), the sub-coding blocks bs16_0, bs16_2, bs8_0, bs8_2, bs8_8, bs8_10, bs4_0, bs4_2, bs4_8, bs4_10, bs4_32, bs4_34, bs4_40, and bs4_42 are adjacent to the left boundary of the coding block B(2,2).

Step S742: The fast RDO circuit 214 uses the reconstructed pixels Rec of the adjacent block to the left of the target sub-coding block to perform prediction. Refer to the discussion of step S724. For example, because when the fast RDO circuit 214 is processing the sub-coding block bs(3,3) (or bs(4,3)), the second-stage operation for the corresponding sub-coding block bs(3,2) (or bs(4,2)) (i.e., the adjacent block) to its left has been completed, the fast RDO circuit 214 can use the reconstructed pixels Rec of the adjacent block (i.e., the sub-coding block bs(3,2) (or bs(4,2))) to perform prediction.

Step S744: The fast RDO circuit 214 uses the original pixels Src of the adjacent block to the left of the target sub-coding block to perform prediction. When the fast RDO circuit 214 is unable to obtain the required reconstructed pixels Rec, it uses the original pixels Src of the adjacent block instead to perform prediction.

Figure 7E:
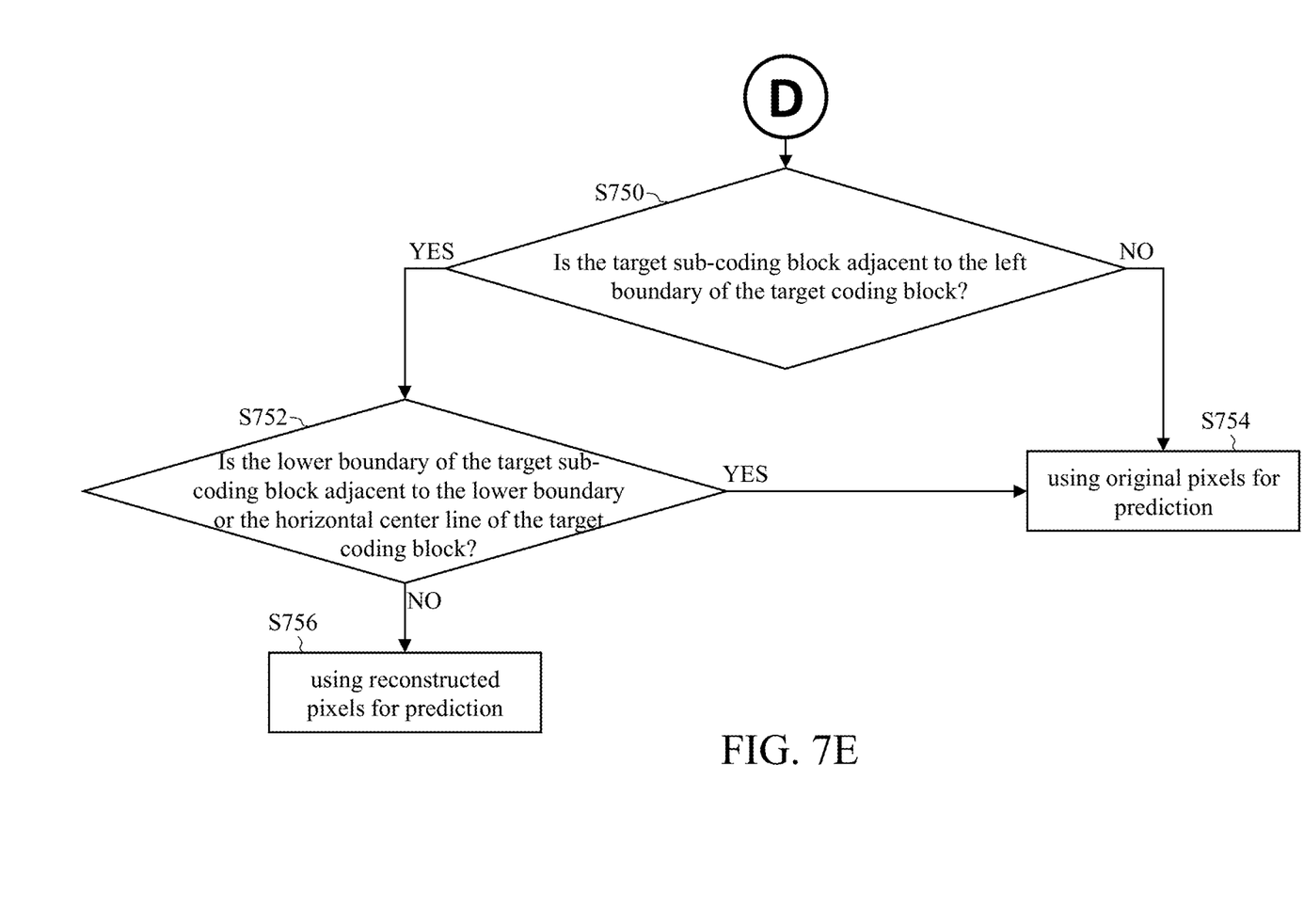

Reference is made to FIG. 7E, which includes the following steps.

Step S750: The fast RDO circuit 214 determines whether the target sub-coding block is adjacent to the left boundary of the target coding block. Refer to the discussion of step S740.

Step S752: The fast RDO circuit 214 determines whether the lower boundary of the target sub-coding block is adjacent to the lower boundary or the horizontal center line HCL of the target coding block. Reference is made to FIGS. 3 and 5. For example, for the sub-coding block bs(3,3) and its sub-coding blocks bs16_2, bs8_10, and bs4_42, because their lower boundaries are adjacent to the horizontal center line HCL of the target coding block, the result of step S752 is YES; for the sub-coding block bs(4,3) and its sub-coding blocks bs16_2, bs8_10, and bs4_42, because their lower boundaries are adjacent to the lower boundary of the target coding block, the result of step S752 is YES. For other sub-coding blocks adjacent to the left boundary of the coding block B(2,2), the result of step S752 is NO.

Step S754: The fast RDO circuit 214 uses the original pixels Src of the adjacent block to the lower left of the target sub-coding block to perform prediction. Refer to the discussion of step S726. For example, for the sub-coding block bs16_2 of the sub-coding block bs(3,3) (or bs(4,3)), because the corresponding sub-coding block (namely, the adjacent block) to its lower left is a part of the sub-coding block bs(4,2) (or the coding block B(3,1)), and the second-stage operation for the sub-coding block bs(4,2) (or the coding block B(3,1)) has not yet been completed (or started), the fast RDO circuit 214 at this time uses the original pixels Src of the adjacent block instead to perform prediction.

Step S756: The fast RDO circuit 214 uses the reconstructed pixels Rec of the adjacent block to the lower left of the target sub-coding block to perform prediction. Refer to the discussion of step S724. For example, because when the fast RDO circuit 214 is processing the sub-coding block bs16_0 of the sub-coding block bs(3,3) (or bs(4,3)), the corresponding sub-coding block (i.e., the adjacent block) to its lower left is a part of the sub-coding block bs(3,2) (or bs(4,2)), and the second-stage operation for the sub-coding block bs(3,2) (or bs(4,2)) has been completed, the fast RDO circuit 214 can use the reconstructed pixels Rec of the adjacent block to perform prediction.

In summary, the fast RDO circuit 214 can decide to use the reconstructed pixels Rec or the original pixels Src to perform prediction according to the prediction direction and the relative position between the target sub-coding block and the target coding block. In comparison with the conventional technology that only uses the original pixels Src for prediction, the present invention can improve the speed and accuracy of prediction.

Figure 8:
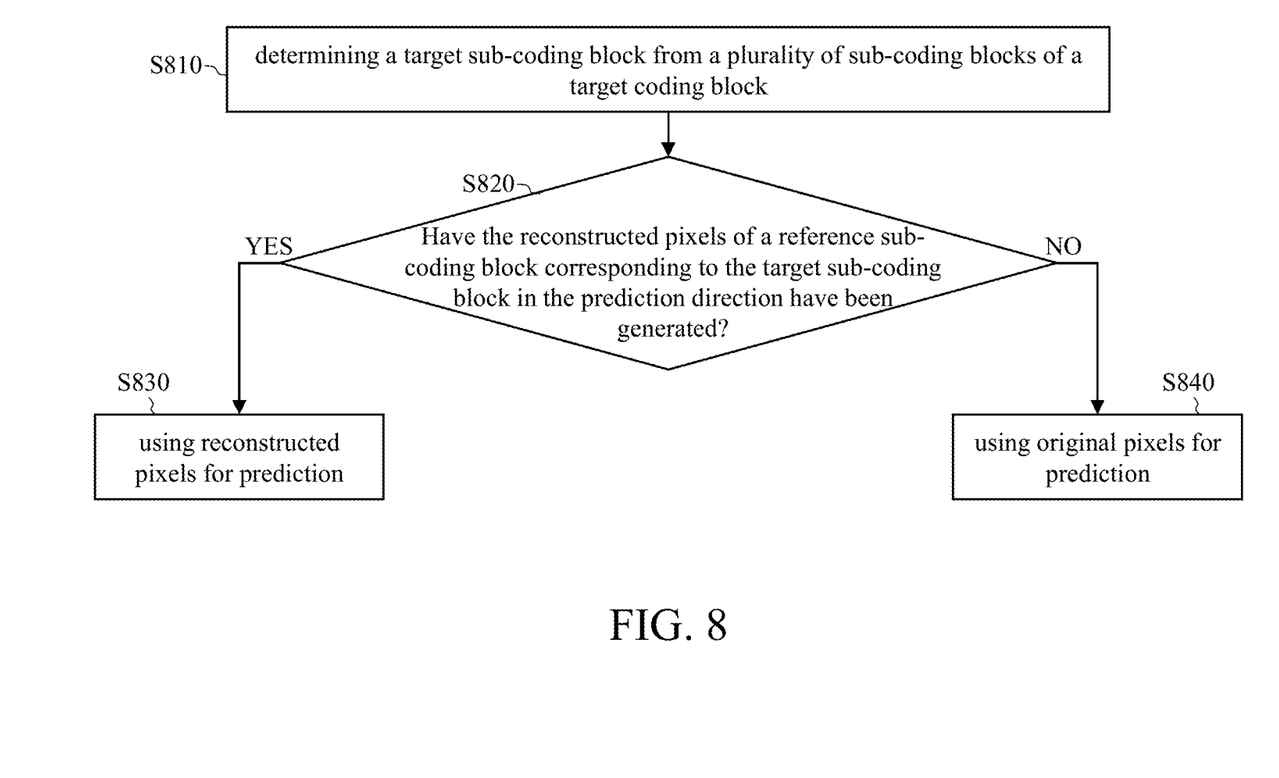
FIG. 8 is a partial flowchart of the first optimization operation according to another embodiment of the present invention.

Reference is made to FIG. 8, which is a partial flowchart of the first optimization operation according to another embodiment of the present invention. The processes of FIGS. 7A to 7E can be summarized into the process of FIG. 8, which includes the following steps.

Step S810: The fast RDO circuit 214 determines a target sub-coding block from a plurality of sub-coding blocks of a target coding block. Refer to the discussion of step S710.

Step S820: The fast RDO circuit 214 determines whether the reconstructed pixels of a reference sub-coding block corresponding to the target sub-coding block in the prediction direction (e.g., an adjacent block of the target sub-coding block in the prediction direction) have been generated (i.e., to determine whether the reconstructed pixels of the reference sub-coding block have been stored in the memory 122). For example (see FIG. 3), when the target sub-coding block is the sub-coding block bs(4,3) (or bs(4,4)) and the prediction direction is upward, the adjacent block of the sub-coding block bs(4,3) (or bs(4,4)) in the prediction direction is the sub-coding block bs(3,3) (or bs(3,4)). The result of step S820 corresponds to the results of step S720, step S722, step S730, and step S740 being YES and corresponds to the results of step S736 and step S752 being NO. The result of step S820 corresponds to the results of step S722, step S734, step S740, and step S750 being NO and corresponds to the results of step S736 and step S752 being YES.

Step S830: The fast RDO circuit 214 uses the reconstructed pixels Rec of the adjacent block to perform prediction. Refer to the discussions of step S724, step S732, step S742, or step S756.

Step S840: The fast RDO circuit 214 uses the original pixels Src of the adjacent block to perform prediction. Refer to the discussions of step S726, step S738, step S744, or step S754.

A coding block of 64*64 pixels is intended to illustrate the invention by way of example and not to limit the scope of the claimed invention. People having ordinary skill in the art may apply the present invention to coding blocks of various sizes in accordance with the foregoing discussions.

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A video encoder comprising:
    a prediction circuit configured to:
        perform a first optimization operation on a first sub-coding block to select original pixels or reconstructed pixels of an adjacent block of the first sub-coding block according to a base prediction mode to generate an intermediate prediction mode of the first sub-coding block;
        perform a second optimization operation on the first sub-coding block to determine a prediction mode according to the intermediate prediction mode, original pixels of the first sub-coding block, and the reconstructed pixels of the adjacent block of the first sub-coding block; and
        generate prediction information of the first sub-coding block according to the original pixels of the first sub-coding block, the reconstructed pixels of the adjacent block of the first sub-coding block, and the prediction mode, wherein the prediction information comprises a plurality of predicted pixels and a residual value between the original pixels and the plurality of predicted pixels;
    a computing circuit coupled to the prediction circuit and configured to generate a plurality of encoding coefficients and reconstructed pixels of the first sub-coding block according to the prediction information of the first sub-coding block; and
    a coding circuit coupled to the prediction circuit and the computing circuit and configured to generate a bit stream according to the plurality of encoding coefficients and the prediction information.

2. The video encoder of claim 1, wherein selecting the original pixels or the reconstructed pixels of the adjacent block of the first sub-coding block according to the base prediction mode to generate the intermediate prediction mode of the first sub-coding block comprises:
    selecting the reconstructed pixels of the adjacent block to generate the intermediate prediction mode when the reconstructed pixels of the adjacent block have been generated; or selecting the original pixels of the adjacent block to generate the intermediate prediction mode when no reconstructed pixels of the adjacent block are generated.

3. The video encoder of claim 1, wherein the prediction circuit performs the first optimization operation on a second sub-coding block while performing the second optimization operation on the first sub-coding block, the first sub-coding block and the second sub-coding block being consecutive in a coding order.

4. The video encoder of claim 3, wherein the first sub-coding block is an adjacent block of the second sub-coding block in a prediction direction of the base prediction mode, and the first optimization operation is performed on the second sub-coding block according to the original pixels of the first sub-coding block.

5. The video encoder of claim 1, wherein the video encoder sequentially processes a first coding block, a second coding block, and a third coding block that are continuously arranged in a frame, the second coding block is between the first coding block and the third coding block, the second coding block comprises a plurality of sub-coding blocks, and the first sub-coding block is one of the plurality of sub-coding blocks, the first optimization operation comprising following steps:
    deciding, according to a prediction direction and a position of the first sub-coding block relative to the second coding block, to use the original pixels or the reconstructed pixels of the adjacent block of the first sub-coding block to generate the intermediate prediction mode.

6. The video encoder of claim 5, wherein the second coding block comprises a first upper boundary, a lower boundary, a left boundary, a right boundary, and a horizontal center line that equally divides the second coding block and is parallel to the first upper boundary, when the first sub-coding block is adjacent to the first upper boundary and the prediction direction is upward, or when a second upper boundary of the first sub-coding block is adjacent to the horizontal center line and the prediction direction is upward, the prediction circuit uses the reconstructed pixels of the adjacent block to generate the intermediate prediction mode.

7. The video encoder of claim 5, wherein the second coding block comprises an upper boundary, a lower boundary, a left boundary, and a right boundary, when the first sub-coding block is adjacent to the upper boundary and the prediction direction is upper right, or when the first sub-coding block is adjacent to the left boundary and the prediction direction is left, the prediction circuit uses the reconstructed pixels of the adjacent block to generate the intermediate prediction mode.

8. The video encoder of claim 5, wherein the second coding block comprises a first upper boundary, a lower boundary, a left boundary, a first right boundary, a horizontal center line that equally divides the second coding block and is parallel to the first upper boundary, and a vertical center line that equally divides the second coding block and is parallel to the first right boundary; when a second upper boundary of the first sub-coding block is adjacent to the horizontal center line but a second right boundary of the first sub-coding block is not adjacent to the first right boundary and the vertical center line, and the prediction direction is upper right, the prediction circuit uses the reconstructed pixels of the adjacent block to generate the intermediate prediction mode.

9. The video encoder of claim 5, wherein the second coding block comprises an upper boundary, a first lower boundary, a left boundary, a right boundary, and a horizontal center line that equally divides the second coding block and is parallel to the upper boundary; when the first sub-coding block is adjacent to the left boundary but a second lower boundary of the first sub-coding block is not adjacent to the first lower boundary and the horizontal center line, and the prediction direction is lower left, the prediction circuit uses the reconstructed pixels of the adjacent block to generate the intermediate prediction mode.

10. The video encoder of claim 1, wherein a prediction direction of the base prediction mode is one of upward, upper right, left, and lower left.

11. A video encoding method comprising:
- performing a first optimization operation on a first sub-coding block to select original pixels or reconstructed pixels of an adjacent block of the first sub-coding block according to a base prediction mode to generate an intermediate prediction mode of the first sub-coding block;
- performing a second optimization operation on the first sub-coding block to determine a prediction mode according to the intermediate prediction mode, original pixels of the first sub-coding block, and the reconstructed pixels of the adjacent block of the first sub-coding block;
- generating prediction information of the first sub-coding block according to the original pixels of the first sub-coding block, the reconstructed pixels of the adjacent block of the first sub-coding block, and the prediction mode, wherein the prediction information comprises a plurality of predicted pixels and a residual value between the original pixels and the plurality of predicted pixels;
- generating a plurality of encoding coefficients and reconstructed pixels of the first sub-coding block according to the prediction information of the first sub-coding block; and
- generating a bit stream according to the plurality of encoding coefficients and the prediction information.

12. The method of claim 11, wherein the step of selecting the original pixels or the reconstructed pixels of the adjacent block of the first sub-coding block according to the base prediction mode to generate the intermediate prediction mode of the first sub-coding block comprises:
- selecting the reconstructed pixels of the adjacent block to generate the intermediate prediction mode when the reconstructed pixels of the adjacent block have been generated; or selecting the original pixels of the adjacent block to generate the intermediate prediction mode when no reconstructed pixel of the adjacent block are generated.

13. The method of claim 11 further comprising: performing the first optimization operation on a second sub-coding block while performing the second optimization operation on the first sub-coding block, the first sub-coding block and the second sub-coding block being consecutive in a coding order; wherein the first sub-coding block is an adjacent block of the second sub-coding block in a prediction direction of the base prediction mode, and the first optimization operation is performed on the second sub-coding block according to the original pixels of the first sub-coding block.

14. The method of claim 11, wherein the video encoding method sequentially processes a first coding block, a second coding block, and a third coding block that are continuously arranged in a frame, the second coding block is between the first coding block and the third coding block, the second coding block comprises a plurality of sub-coding blocks, and the first sub-coding block is one of the plurality of sub-coding blocks, the first optimization operation comprising following steps:
- deciding, according to a prediction direction and a position of the first sub-coding block relative to the second coding block, to use the original pixels or the reconstructed pixels of the adjacent block of the first sub-coding block to generate the intermediate prediction mode.

* * * * *